Aug. 20, 1963   C. W. PETERSEN ET AL   3,101,475
BREAD HANDLING APPARATUS
Filed Jan. 30, 1959                              6 Sheets-Sheet 1

INVENTORS
CONRAD W. PETERSEN
WALLACE W. WITTENBERGER
JOHN M. ST. JOHN

BY
ATTORNEYS

Aug. 20, 1963  C. W. PETERSEN ET AL  3,101,475
BREAD HANDLING APPARATUS
Filed Jan. 30, 1959  6 Sheets-Sheet 2
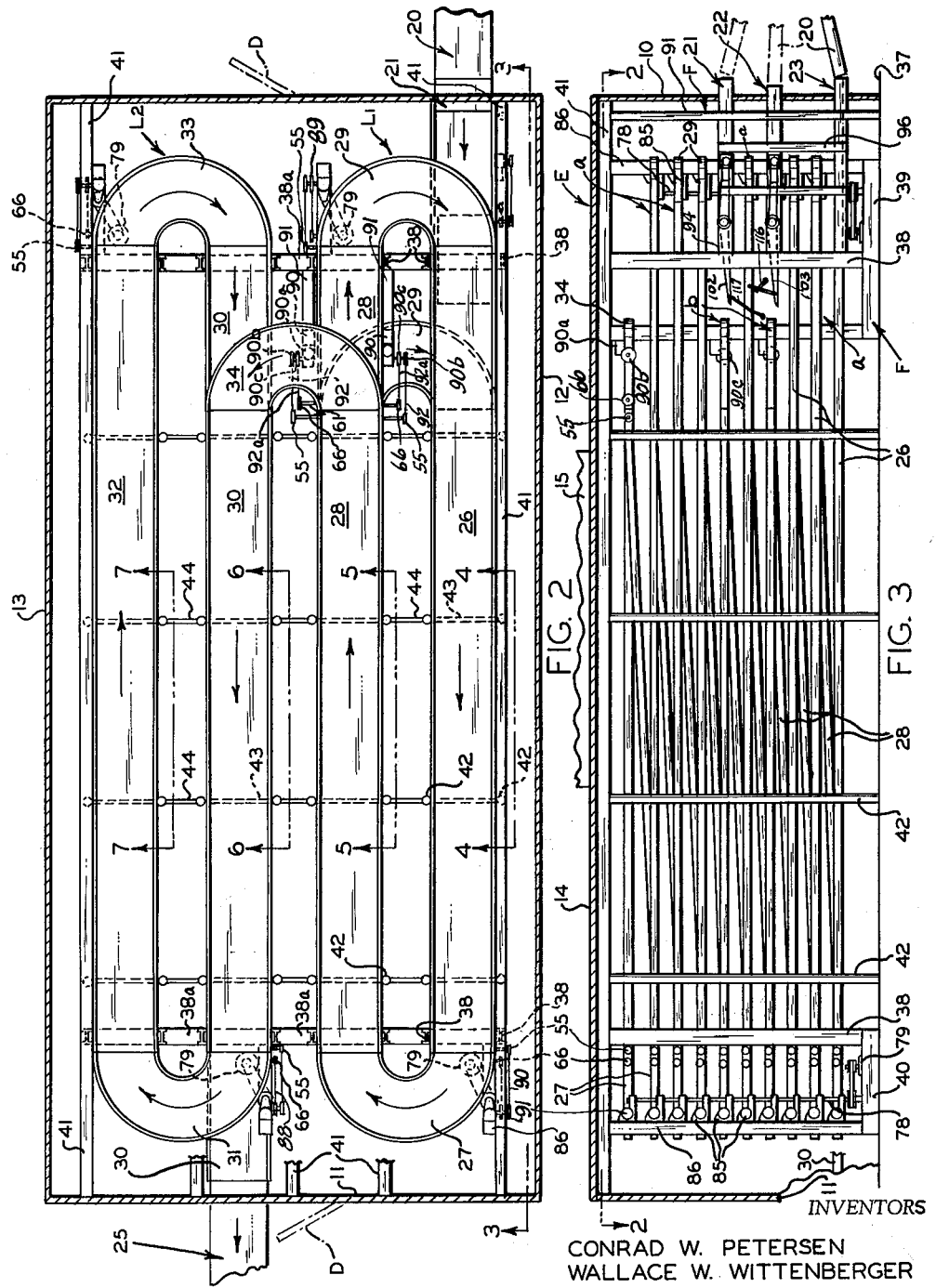
INVENTORS
CONRAD W. PETERSEN
WALLACE W. WITTENBERGER
JOHN M. ST. JOHN
BY
ATTORNEYS

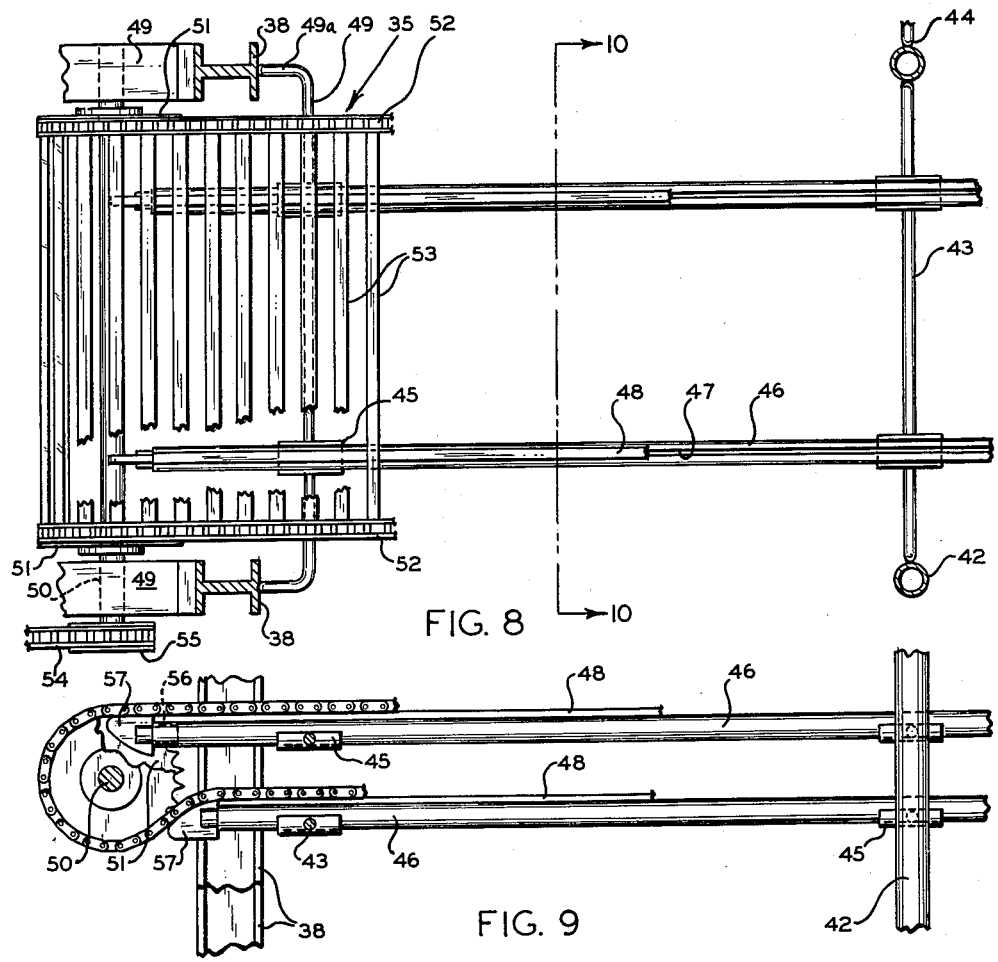
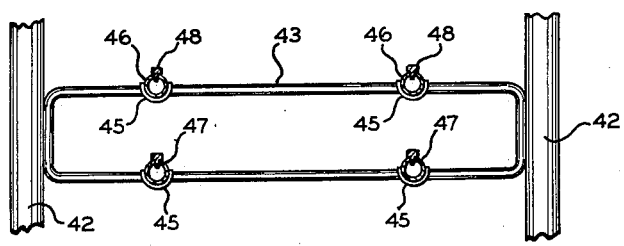
FIG. 8
FIG. 9
FIG. 10
INVENTORS
CONRAD W. PETERSEN
WALLACE W. WITTENBERGER
JOHN M. ST. JOHN
ATTORNEYS Aug. 20, 1963  C. W. PETERSEN ET AL  3,101,475
BREAD HANDLING APPARATUS
Filed Jan. 30, 1959  6 Sheets-Sheet 6
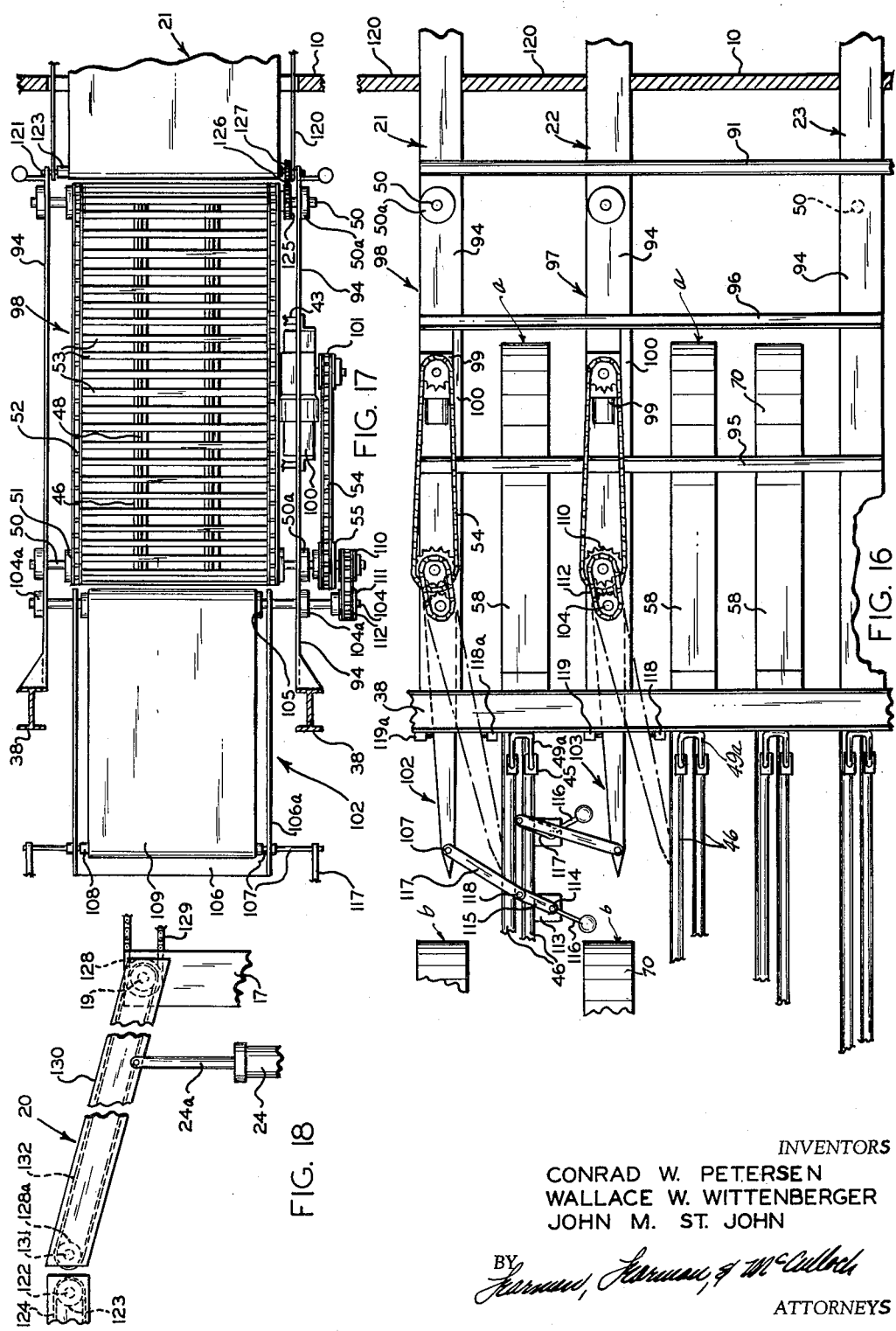
INVENTORS
CONRAD W. PETERSEN
WALLACE W. WITTENBERGER
JOHN M. ST. JOHN
ATTORNEYS

United States Patent Office

3,101,475
Patented Aug. 20, 1963

3,101,475
BREAD HANDLING APPARATUS
Conrad W. Petersen, Wallace W. Wittenberger, and John M. St. John, Saginaw, Mich., assignors to Baker Perkins Inc., Saginaw, Mich., a corporation of New York
Filed Jan. 30, 1959, Ser. No. 790,240
8 Claims. (Cl. 198—84)

This invention relates generally to improvements in bread making or processing apparatus and the like, and more particularly to production type proofers for proofing dough products preparatory to passing them to a baking oven. Many different proof boxes have been designed for moving dough products continuously in an elongate path of travel through a chamber in which the temperature and relative humidity is regulated in accordance with the time the products remain in the proofing atmosphere to provide the desired fermentation of the yeast in the dough. Batch type proofers of a size adequate for most bakeries are generally unsatisfactory since some time is required to load the dough products into a batch type proof box and unload them therefrom, and accordingly the dough products will be exposed to the atmosphere of the proofer for periods of varying time, with the result that some will be in the proofer for too short a time while others will remain in the proofer too long a time.

Further, proofing apparatus which employs relatively wide trays or multi-shelved racks moving through a continuous circuit, while providing a more uniform product, still does not provide as uniform a product as desired because of variations in atmospheric conditions within the enclosure at the top, bottom, and sides thereof relative to the more central portions thereof.

It is a primary object of the present invention to provide a continuous proofer in which the pan proof obtained is absolutely uniform because every strap of pans follows the same path through the proofer and is subjected to identical temperature, humidity, and air movement conditions.

Another important object of the invention is to provide proofing apparatus of the character described which provides the baker with some flexibility so far as the proofing times which are available are concerned without changing the speed of travel of the products in the production system. In the case of the instant apparatus the baker is provided with mechanism for selectively delivering the product to different points in the continuous proofer conveying system so that different proof times can be obtained in accordance with different formulas it may be desirable to use. By providing proofing apparatus in which different, predetermined proofing times are available in this way, different products can be tailored to different markets without drastic changes in humidity and temperature conditions within the proof box and it is not necessary to empty the proof box of one product before commencing the processing of another product.

A further object of the invention is to provide a proofer which is adaptable to space conditions in various bakeries in the sense that it can be built around existing support columns and the like.

Another object of the invention is to provide continuous proofing apparatus of the character described in which each loaf in every pan proceeding in the path of travel in the proofer is accessible for removal, if such should be necessary, or for inspection to examine proofing results at any stage of the proof.

Another object of the invention is to design proofing apparatus which is designed to permit as much free circulation of air as possible within the proofer enclosure; which can be simply driven by a minimum number of motors which require no synchronization or complex electrical control system; and which provides an efficient, convenient, and relatively economical dough handling or proofing system of highly reliable character.

Still a further object of the invention is to provide proofing apparatus wherein continuous, slat-type, endless conveyors are compactly arranged in a pair of contiguous stacks of juxtaposed loops within the enclosure to provide an adequately long path of travel in a system which efficiently uses the available space in a manner to overcome difficulties and disadvantages in present proofing practices.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

FIGURE 2 is an enlarged, top plan, sectional, schematic view taken on the line 2—2 of FIGURE 3, with certain elements omitted from the view in the interest of clarity, the conveyor loops which are shown being shown schematically as rectangular members;

FIGURE 3 is a sectional, elevational, schematic view taken on the line 3—3 of FIGURE 2 with certain elements again being omitted in the interest of clarity, the conveyor loops being shown in the manner indicated rather than as continuous slat conveyors, in the interest of clarity also;

FIGURE 8 is an enlarged, fragmentary, top plan view illustrating the construction of the conveyors which form the side runs of the juxtaposed conveyor loops and depicting the manner in which these conveyors are supported;

FIGURE 9 is a fragmentary, side elevational view thereof;

FIGURE 10 is a transverse, sectional view taken on the line 10—10 of FIGURE 8;

FIGURE 16 is an enlarged, fragmentary, side elevational view of the front portion of the proofer conveying system showing the conveyor assembly for selectively feeding different loops of the conveyor system;

FIGURE 17 is a top plan view thereof; and

FIGURE 18 is an enlarged, fragmentary view illustrating the construction of the variably positionable conveyor section which is employed to selectively feed different loops of the conveying system.

Figure 4:
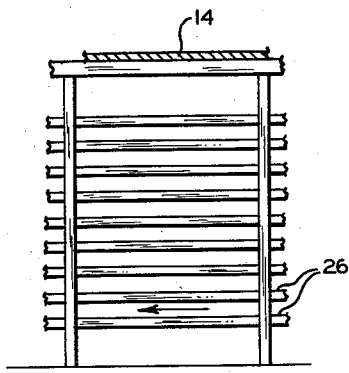
FIGURE 4 is a fragmentary, sectional, elevational view taken on the line 4—4 of FIGURE 2, showing only the adjacent loop sections.
Figure 5:
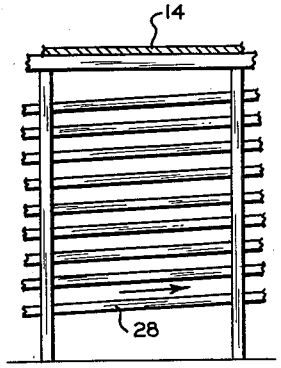
FIGURE 5 is a similar view taken on the line 5—5 of FIGURE 2, illustrating the pitch of the loop sections which are shown.
Figure 6:
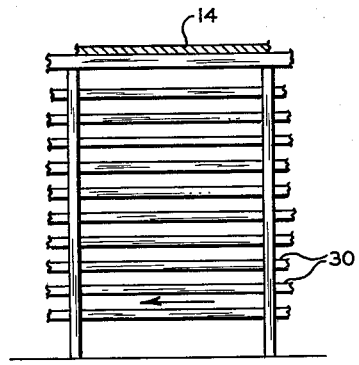
FIGURE 6 is a view similar to FIGURE 4, taken on the line 6—6 of FIGURE 2.

Referring now more particularly to the accompanying drawings, in which we have shown a preferred embodiment of the invention only, a letter F is employed to generally indicate the proofer supporting framework which supports an enclosure E having suitably insulated front and rear walls 10 and 11, side walls 12 and 13, and a roof 14. Provided on the roof 14 and communicating with the interior of the enclosure E is a casing 15 enclosing the air conditioning units which control the humidity and temperature within the proofer enclosure. Steam heating coils and a steam injection system, with suitable duct work and a recirculating blower, may be provided but will not be shown or described, since they form no part of the invention to which the present application is directed.

At the front of the proofer enclosure E an endless belt conveyor 16 of conventional design, which may be supported by a pair of spaced apart post members 17, is shown transporting the dough in pan sets 18 from the moulder. Mounted for pivotal movement about its front end roll shafts 19 which are journaled by the posts 17 is a conveyor generally designated 20 which, as the diagrammatic lines indicate, is swingable vertically so that it selectively feeds any one of the vertically spaced, endless conveyor members generally indicated by the numerals 21, 22, and 23. The manner in which the conveyors 21, 22, and 23 deliver the pansets to the proofer conveying system will presently be explained in considerable detail. A conventional solenoid valve actuated, double acting, pneumatic cylinder 24 having a piston rod 24a may be utilized in the usual manner to raise and support the conveyor 20 in the desired position.

Figure 7:
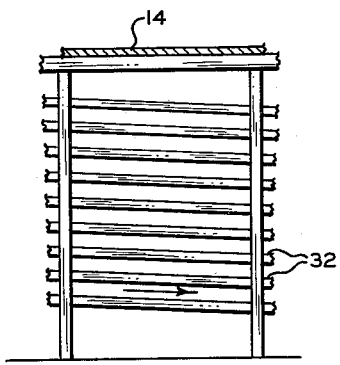
FIGURE 7 is a similar view taken on the line 7—7 of FIGURE 2, illustrating the opposite inclination of the loop sections which are shown.

To place the invention in proper perspective, it should be noted that the proofer enclosure will be on the order of 60 feet in length, 22 feet in width, and 12 feet in height. Within the enclosure E is a continuous conveyor system which comprises two side-by-side stacks of loops or loop sections L1 and L2 (see FIGURE 2), as will be seen. The stack of loop sections L1 leads upwardly in generally spiral fashion from the lower portion of the housing E to the upper portion of the housing E and the elongate loops or loop sections of stack L2 lead generally spirally downwardly from the upper portion of the proofer enclosure to the lower portion thereof and discharge to an outgoing conveyor generally designated 25 which conveys the discharged pansets immediately to the oven. The stack of loops L1 includes loops "a" of the same length as the loops in stack L2 and loops "b" having portions of shorter length which, it will be noted, are generally on a level with conveyors 21 and 22. All of the loops in the stack of loops L2 are of the same length. In FIGURES 2 and 3, which are schematic views, the conveyors are represented conveniently in box form so that the circuit may be easily followed, however, conveyors which particularly lend themselves to use in the circuit will presently be described in detail. Each complete loop in the stack of loops L1 comprises a rearwardly extending, side run, endless conveyor 26 which extends horizontally (see FIGURE 4), joined by an adjacent curvilinear, rear end run, endless conveyor 27 to a forwardly and upwardly proceeding, opposite side run, endless conveyor 28 which is joined to the immediately superjacent loop in the stack L1 by an adjacent curvilinear, front end run, endless conveyor 29. In the case of the loops "b" designated, the front end run conveyors 29 are inset with respect to the other front end run conveyors 29. Each complete loop in the stack of loops L2 is formed of a rearwardly and horizontally extending, side run, endless conveyor 30 joined by an adjacent, curvilinear, rear end, endless conveyor 31 extending horizontally to an opposite, downwardly and forwardly extending side run, endless conveyor 32 (see FIGURE 7) which is connected with the immediately subjacent loop in the stack L2 by a curvilinear, front end run, endless conveyor 33.

The lowermost conveyor 26 in stack L1 extends forwardly a sufficient distance beyond the other side run conveyors 26 to receive pansets 18 from conveyor 23 and the lowermost side run conveyor 30 extends rearwardly a sufficient distance beyond the superjacent conveyors 30 to discharge pansets to the conveyor 25. The side run conveyors 28 leading to the inset conveyors 29 and the side run conveyors 26 leading away therefrom are, of course, of less length than the other side run conveyors 26 and 28. Also, the uppermost side run conveyor 28 and the uppermost side run conveyor 30 terminate short of the longer side run conveyors 28 and the other side run conveyors 30 and the adjacent curvilinear, end run, endless conveyor 34, which is inset as shown, connects them and, accordingly, joins the pair of stacks L1 and L2.

*The Conveyors*

Each of the conveyors 26–33, as well as the stack connecting conveyor 34, preferably comprises a single, endless, slat type conveyor which provides a maximum circulation of air within the proofer housing E. As shown in FIGURE 8, each side run conveyor 26, 28, 30, and 32, is of the type shown in detail in FIGURES 8 and 9 at 35 and is supported either in horizontal position or in upwardly or downwardly sloped position as previously indicated. Each end run conveyor 27, 29, 31, and 33, and the stack connecting end run conveyor 34, is formed, as indicated at 36 in FIGURES 11–13, in a manner which will also be described in detail.

The framework F (FIGURES 2 and 3) which supports the various elements of the conveyor system from the floor 37 of the building in which the proofer is located includes vertically disposed I-beams 38 or the like joined by cross members 38a at the front and rear ends of the proofer, and extending vertically from a lower front frame member 39 and a lower rear frame member 40 to top frame members 41 which extend the full length of the proofer enclosure E. These members form supporting front and rear columns in effect with pairs of beams 38 on opposite sides of the side run conveyors 26, 28, 30, and 32, as shown. Intermediately positioned, longitudinally spaced apart pipe members 42 are provided longitudinally spaced intermediate the I-beam members 38 and connect to the joist frame members 41.

Mounted between the pipe frame members 42 (see FIGURES 3 and 8–10) are rectangular shaped, tubular sections 43 and 44, the pipe sections 43 being provided to support the slat type, side run conveyors 26, 28, 30, and 32 and the members 44 to connect and brace the pipe members 42 between the side run conveyors. As should be apparent, the continuous frame members 43 and 44 can be welded to the pipes along their ends and these structural components, which are the only ones which need be provided in the proofer for supporting the side run conveyors over most of their length, provide a neat, strong, and practical supporting framework which requires little space within the proofer housing. The rectangular, tubular members 43 carry saddles 45 for supporting pairs of longitudinally extending upper and lower pipe sections 46 which are slotted over their length as at 47 to accommodate elongate, nylon wear strips of T cross section 48. At the front and rear ends of the side run conveyors, tubular support members 49 are provided which are identical with the support members 43 and 44 except that they are longer and their ends are bent laterally as at 49a so that they can be secured to the beams 38.

In FIGURES 8 and 9 a rear end of one of the side run conveyors generally designated 35 is shown and in this instance the conveyor is being driven from its rear end; however, it is to be understood that the front end of the side run conveyor 35 will be identical except that in some cases the conveyor may be driven at its front end. Bearing plates 49 extending outwardly from the front and rear beams 38 journal the front and rear shafts 50 of the side run conveyors and the spaced apart sprockets 51, over which the conveyor chains 52 are trained, are fixed on the shafts 50 as shown. As will be seen in FIGURE 8, the sprockets 51 are spaced outwardly from the wear strips 48 which support the conveyor slats or rods 53 welded in longitudinally spaced apart relation to the links of the chains 52 in any suitable manner. A number of conventional slat type chains of this general design are available and any one of a number of designs may be employed.

The rear shaft 50 in FIGURE 8 is shown as driven by a chain 54 trained around a sprocket 55 fixed on the shaft 50 and it will not be necessary to show the front end of this typical conveyor 35, which will be identical except that it will not be necessary to mount a drive sprocket 55 on the front shaft 50. In the case of the side run conveyors 26 and 30 the drive sprocket 55 will be mounted on the rear shaft 50, whereas in the case of side run conveyors 28 and 32 the drive sprocket 55 is mounted on the front shaft 50 but on the opposite end (see FIGURE 2). At their front and rear ends the pipe sections 46 terminate just short of the shafts 50 and plugs 56 having shoe members 57 thereon which, it will be noted, are interchangeable for either of the upper or lower pipe sections 46, enclose the ends of the pipes 46, the shoes 57 being provided to support the chains and, in the case of the lower pipes 46, also to guide the chains 52 up onto the lower wear strips 48. The pipes 46 will be suitably bent in the case of runs 28 and 32 to provide the desired inclination.

Figure 11:
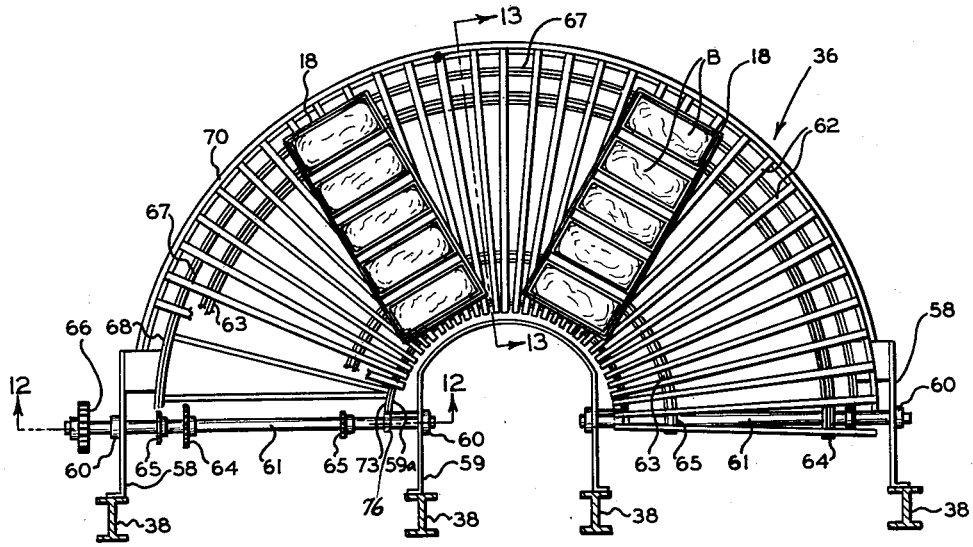
FIGURE 11 is a plan view similar to FIGURE 8 illustrating the construction of the curvilinear end run conveyors of the various loop sections and showing pan sets in position thereon.
Figure 12:
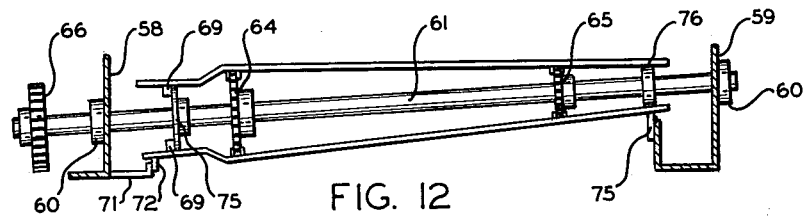
FIGURE 12 is an enlarged, transverse, sectional view taken on the line 12—12 of FIGURE 11.
Figure 13:
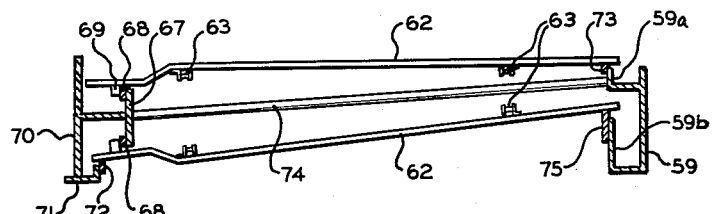
FIGURE 13 is a similarly enlarged, transverse, sectional view taken on the line 13—13 of FIGURE 11.

The end run conveyors generally designated 36 are illustrated particularly in FIGURES 11-13, which shows a rear end run conveyor, and must, of course, reverse the longitudinal path of travel of the pansets 18. The various structural components of each of these 180° turns are supported from the beams 38 by side bracket members 58 and a generally U-shaped bracket member 59 supported between the brackets 58. Provided on the side bracket members 58 and the central bracket 59 are bearings 60 which journal the conveyor end shafts 61, which, as shown in FIGURE 12, are pitched slightly downwardly from the inner ends thereof. The endless conveyors comprise, as previously, spaced apart strap or bar members 62 carried by chains 63. Because, in moving around the turn, the inner ends of the slats 62 move through only a relatively short path of travel and at a slower speed than the outer ends of the slats 62 which must travel a much greater distance, the outer sprockets 64, around which the outer chain 63 is trained, will be of somewhat greater diameter than the inner sprocket 65 around which the inner chain 63 is trained. Sprockets 64 and 65 are, of course, suitably fixed on the shafts 61 and in the case of the rear end run conveyor shown in FIGURE 11 the left hand shaft 61 is being driven through a sprocket 66 fixed on its outer end as shown.

Mounted on the side brackets 58 to aid in supporting the conveyor slats 62 in their travel is a semi-annular rail 67 which has elongated upper and lower wear strips 68 provided thereon. Dependent cylindrical members 69 fixed to the downwardly and thence outwardly bent outer ends of the slats 62 are provided to guide on the wear strips 68. The rail 67 is supported in position from the brackets 58 by a semiannular support member 70 of angular cross section mounted on a semiannular base 71 having a wear strip 72 extending over its length which supports the outer ends of the slats 62 which form the lower run of the conveyor 36. A supporting flange portion 59a of bracket 59 has a wear strip 73 fixed thereon to support the inner ends of the slats of the upper run portion and it will be seen that brace rods 74 unite the members 67 and 59 to provide an integrated conveyor supporting framework. Semiannular wear strip 75 provided on another flange portion 59b of the central bracket 59 supports the slats 62 of the under run in their continuous travel.

Mounted on the shafts 61 in alignment with the wear strips 68 are discs 75 to furnish support for the outer ends of slats 62 during part of their travel around sprockets 64 and similar slat guide collars 76 can be similarly provided in alignment with the wear strips 73 to support the inner ends of the slats 62. Each of the conveyor structures 36 forming the end run conveyors 27, 29, 31, 33, and also turn section 34 are identical except that in some instances the guide sprockets 66 may be mounted on the outer end of the other shaft 61 (see FIGURE 2).

The Drive System

Figure 15:
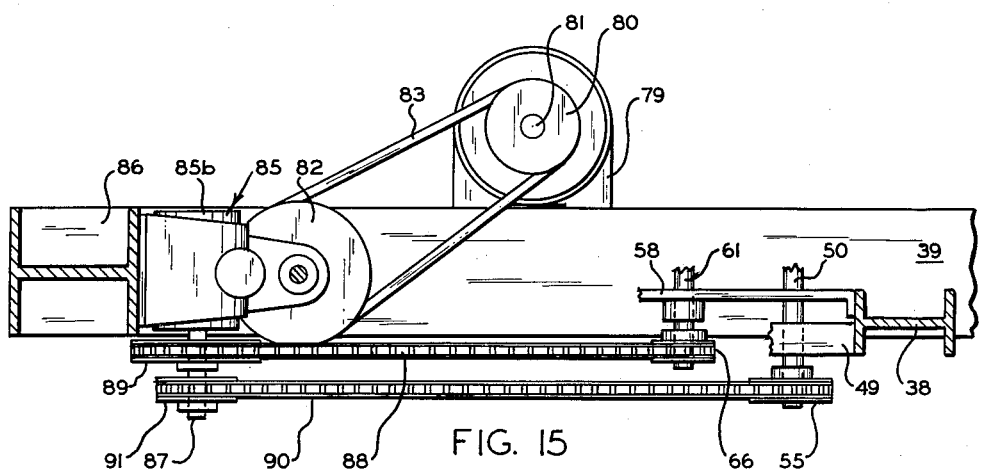
FIGURE 15 is a top plan view thereof.
Figure 14:
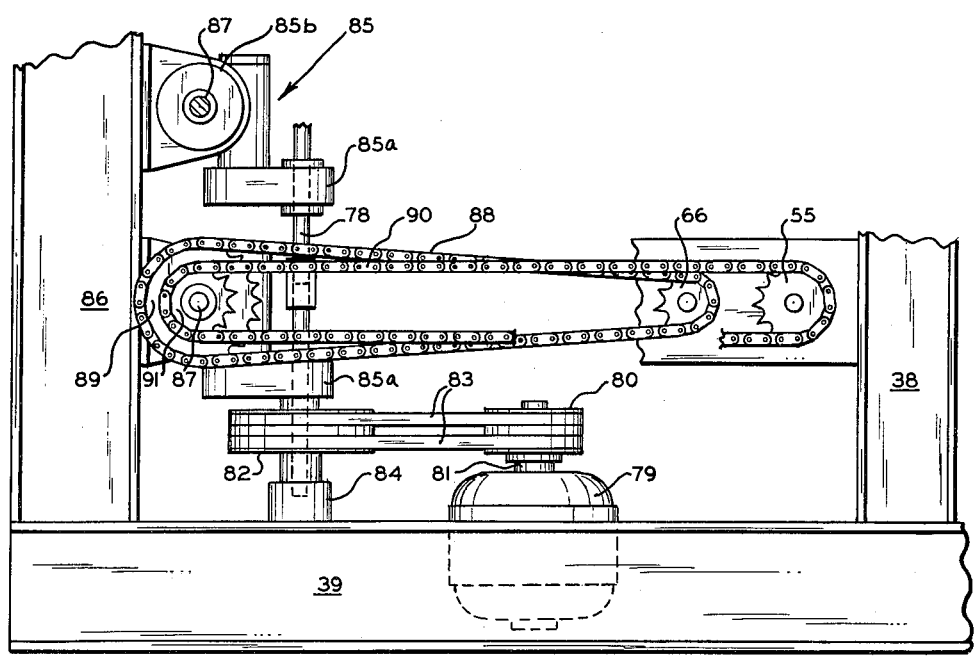
FIGURE 14 is an enlarged, fragmentary, elevational view illustrating the manner in which the side run and end run conveyors are driven from the vertically disposed drive shafts which are provided.

The various conveyors of the stocks of conveyor loops L1 and L2, except for the uppermost conveyor 28, the inset conveyors 29, the conveyors 28 leading thereto, and conveyor 34, are very simply and practically driven from four motors through a system of vertically journaled drive shafts 78 (see FIGURES 2, 3, 14, and 15) which are journaled with relation to the loops in a particular relationship which we deem to be novel. The four electric drive motors 79 are shown in FIGURES 2 and 3 at the juncture of conveyors 26 and 27, conveyors 28 and 29, conveyors 30 and 31, and conveyors 32 and 33. As shown in FIGURES 14 and 15, each motor 79 has a drive pulley 80 mounted on its armature shaft 81 which drives a pulley 82 fixed on the particular drive shaft 78 through the medium of belts 83 trained around the pulleys 80 and 82. The drive shafts 78 are journaled in bearings 84 secured on base members 39 and in the extending input portions 85a of suitable commercial speed reducers 85 which are mounted in suitably spaced, juxtaposed position on beams 86. These beams 86 which form a part of the front and rear support columns extend vertically adjacent each of the end run sections 27, 29, 31, and 33 of the conveyor loop system as shown in FIGURE 2. Each of the speed reducers 85 also has an output section 85b provided with an output shaft 87 which is driven at the desired reduced speed. Both the adjacent side run conveyor and end run conveyor in each loop, except in the case of the shorter side run conveyors 28 and immediately following end run conveyors 29 or 34, as the case may be, are driven from one of the shafts 78, as shown in FIGURES 14 and 15, wherein the appropriate drive sprockets 55 and 66 shown in FIGURES 8 and 11, respectively, are mounted on the appropriate drive shafts 50 and 61, respectively. The particular sprocket 66 is driven by a chain 88 trained around a sprocket 89 on the particular speed reducer shaft 87 and the sprocket 55 as noted by a chain 90 trained around a sprocket 91 on the speed reducer shaft 87. The inset end run conveyors 29 at positions "b" and their communicating side run conveyors 28, and the uppermost side run conveyor 28 and stack connecting end run conveyor 34 are otherwise driven.

In the case of the shorter side run conveyors 28 and inset connecting end runs 29 a gear head motor 79, supported on arm 39, which is in turn attached to end run conveyor frame and side run conveyor structure, is connected with a safety clutch 90a which has an output sprocket 90b on its output shaft driving the sprocket 55 which drives the uppermost side run conveyor 28 through the medium of the chain 92, as shown in FIGURE 2. Similarly, an output sprocket 90c drives the sprocket 66 mounted on the one drive shaft 61 of end run conveyor 29 through the medium of chain 92a. Identical drive elements which for the sake of convenience are represented by the same numerals drive the stack connecting end run conveyor 34 and the side run conveyor 28 which leads to it.

The Selective Loading Means

In order to vary the proof time, means are provided in association with the pivotal conveyor 20 for selectively loading the pansets directly to the side run conveyors 26 under the inset conveyors 29 in the stack of loops L1 so that sections of the conveying system may be short circuited to provide a reduced proof time. FIGURES 16 and 17 particularly illustrate mechanism which can be employed to load the side run conveyors 26 of the loops which include the inset end conveyor runs 29.

Mounted between the vertical beam 38 adjacent the outer side of side run conveyors 26 and a support pipe section 93 are horizontal frame members 94, which are braced and connected by vertical members 95 and 96, as shown. The lowermost members 94 support the front shaft 50 of the lowermost side run conveyor 26 which, as shown, extends forwardly a sufficient distance beyond the other side run conveyors 26 so that it receives the pansets from the lowermost entrance conveyor 23. The intermediate and uppermost side members 94 comprise the side support members of slat type conveyors 97 and 98 which are of the same construction as the conveyor 35 illustrated in FIGURES 8 and 9 and have shafts 50 journaled in bearings 50a fixed on the members 94. For the sake of convenience, only the conveyor 98 will be described in detail and it is to be understood that the construction of the conveyor 97 is identical. The sprockets 51 on the shafts 50 support the slat conveyor chains 52 and the slats 53 are supported on wear strips 48 which are received in longitudinally disposed, tubular members 46, as previously. The tubular support members 43, which have saddles 45 supporting the pipe members 46, are welded to the vertical side members 94 in the same manner that they were previously welded to the frame members 38 and 42. The conveyor drive sprockets 55 of conveyors 97 and 98 are driven from gear motors 99 fixed on motor platforms 100 supported by the vertical members 95 and 96 and chains 54 are trained around the sprockets 55 and sprockets 101 provided on the motors 99. The frame members 94 are also employed to support ramp conveyors 102 and 103 which may each be constructed as shown in FIGURES 16 and 17. Bearings 104a provided on members 94 journal shafts 104 upon which the drive roll 105 of each conveyor 102 and 103 is fixed. A conveyor ramp 106 has side plates 106a which are free to pivot on the conveyor shaft 104 which supports them. The opposite ends of the ramp side rails 106a each support a roll shaft 107 having a roll 108 thereon and a continuous belt member 109 is trained over rolls 108 and 105, as shown. When either of the conveyors 97 or 98 is driven, the corresponding conveyor 102 or 103 will also be driven because a sprocket 110 fixed on the inner shaft 50 of each of the conveyors 97 and 98 drives a sprocket 111 fixed on the adjacent shaft 104 through the medium of a chain 112.

When the conveyors 102 and 103 are in raised position, as shown in FIGURE 16, the pansets are being delivered to the conveyor 23 and accordingly to the lowermost side run conveyor 26. If it is desired that the conveyor 20 delivered to conveyor 22, however, the ramp conveyor 103 will be lowered to the position in which it is shown in diagrammatic lines in FIGURE 16 to deliver pansets to the underlying side run conveyor 26. Similarly, if it is desired that conveyor 20 deliver pansets to the conveyor 21, the ramp conveyor 102 is swung down to deliver them to the underlying side run conveyor 26. The ramp conveyors 102 and 103 may be lowered manually or could be lowered by a suitably operated fluid pressure cylinder, however, in the instant case they are shown as manually operated. Support blocks 113 mounted on the under pipe members 46 of the superjacent side run conveyors 26 are provided to journal shafts 114 on which links 115 and handles 116 are fixed. Connecting the links 115 with the ramps 102 and 103, as the case may be, are links 117 which are pivotally connected both to the links 115 at 118 and to the shafts 107. Thus, as viewed in FIGURE 16, if either of the handles 116 are moved in a clockwise direction the ramps 102 and 103 will be moved to the lowered position in which they are shown in diagrammatic lines. Limit switches 118 and 119, and 118a and 119a, electrically connected to the motors 99 and 100 respectively, start and stop the motors 99 and 100, dependent on the positions of the ramp conveyors 102 and 103.

Each of the delivery conveyors 21, 22, and 23 can, of course, be of any suitable design but in the instant case are shown as belt conveyors which are supported by side plates 120 which journal inner shafts 121 and outer shafts 122 (see FIGURE 18). The shafts 121 and 122 have roll portions 123 around which endless belts 124 may be trained and to drive them sprockets 125 could be mounted on the outer shafts 50 of conveyors 97, 98, and the lowermost side run conveyor 26, the sprockets 125 being driven by chains 126 trained around sprockets 127 on shafts 121.

The takeoff conveyor 25 is of exactly the same construction as any of the conveyors 21, 22, or 23 and extends, of course, into end-to-end adjacency with the lowermost side run conveyor 30 which, like the lowermost side run conveyor 26, extends some distance rearwardly beyond the other side run conveyors 30, as indicated in FIGURE 2. Conveyor 20, which selectively feeds one of the conveyors 21, 22, and 23, can be of the same construction as the conveyors 102 and 103 in the sense that it is pivotal about its front roll shaft 19 (see FIGURE 18) which can be supported by the posts 17, as shown. The shaft 19 can be driven through a sprocket 128, fixed thereon, by means of a chain 129 run by the conveyor 16, or could be driven by a separate motor. The side plates 130, which are pivotal on the reduced front roll shaft ends 19, support the front roll shaft 131 and the conveyor 20 is provided with endless belt 132. Instead of employing an actuating cylinder 24 to adjust its position, the conveyor 20 could, of course, be propped in selected position by a support of suitable height.

The operation of the proofing apparatus should be readily apparent from the foregoing description. The motors 79 and 90 are, of course, driven continuously during the time that the proofer is processing dough products. When it is desired that the bread or the like be in the proofer atmosphere for the maximum time, conveyor 20 is positioned, as indicated by the unbroken lines in FIGURE 3, in the position in which it delivers the pansets to the lowermost side run conveyor 26 which further transports them rearwardly substantially the full length of the proofer enclosure to the lowermost end conveyor run 27 for delivery to the lowermost side run conveyor 28. As the panels are transported forwardly by the side run conveyor 28 they are at the same time carried upwardly at a slightly inclined angle so that they can be delivered to the lowermost front end conveyor 29 which, it will be seen, is slightly above the lowermost side run conveyor 26. When the pansets have been delivered by the lowermost end run conveyor 29 to the adjacent side run conveyor 26 they will have completed the first loop and it will be understood that the pansets are carried by succeeding loops in the manner indicated until the uppermost side run conveyor 28 delivers them to the stack connecting end run conveyor 34. From the connecting end run conveyor 34 the pansets move horizontally rearwardly on the uppermost side run conveyor 30 and are delivered to the uppermost end run conveyor 31. Thence the pansets move both forwardly and downwardly at an inclined angle on the uppermost side run conveyor 32 and are delivered to the uppermost front end run conveyor 33 as shown. The uppermost side run conveyor 30, end run conveyor 31, side run conveyor 32, and end run conveyor 33 constitute the uppermost loop of the second stack of loop sections L2. When the pansets reach the lowermost side run 31 they pass to the discharge conveyor 25 for delivery to the oven.

Preferably the pans are disposed broadside to their path of travel, as indicated in FIGURE 11, however, this need not be the case. The proofer is rated to process between 4,000 and 10,000 pounds of dough per hour but can be built for any commercial production rate. Since the motors 97 and 90 operate at one speed in a plant having a continuous production line operating at a desired speed, the proofer has been designed to provide a variable proofing time.

Figure 1:
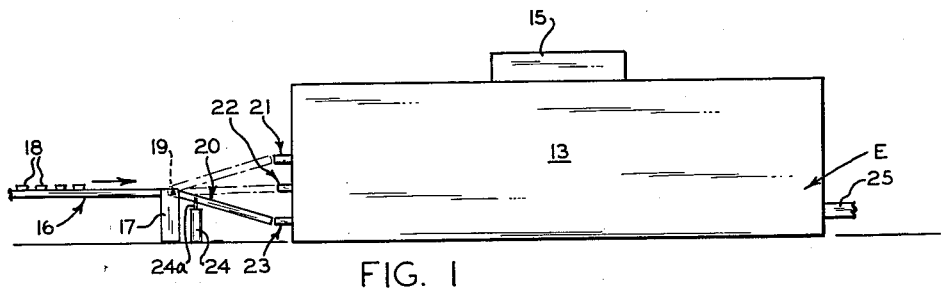
FIGURE 1 is a schematic, side elevational view of the proof box which shows conveyor elements transporting the product toward the front end thereof, the diagrammatic lines indicating adjusted positions of a conveyor section which can be employed to selectively load the proofer at different levels.

In the proofer which is shown, two end run conveyors 29 are inset, as shown at "b" in FIGURE 3, and thus three different proofing times are possible. If the proofing time of medium duration is desired, entry to the proofer enclosure is made through one of the doors D and the handle 116 of conveyor ram 103 is moved clockwisely, as viewed in FIGURE 16, to drop the ramp conveyor 103 to the broken line position in which it is shown in diagrammatic lines. At the same time, the pneumatic cylinder 24 is operated to raise the conveyor 20 to the intermediate position shown in diagrammatic lines in FIGURE 1. When the conveyor 103 is settling into position it operates limit switch 118 to start the motor 99 driving conveyors 97 and 103. The bottom two loops in stack L1 are thus short circuited by the ramp conveyor 103 which delivers to the side run conveyor 26 of the third loop from the bottom, as viewed in FIGURE 3. Prior to the time the ramp 103 is moved downwardly, delivery from conveyors 16 and 20 must be interrupted while the proofer operates for a sufficient length of time to move all pansets past the point of delivery of ramp conveyor 103, of course.

If it is then desired to employ a different proof time, the ramp conveyor 103 is raised to its uppermost position, as shown in FIGURE 16 in solid lines, by swinging the handle 116 counterclockwisely and when the conveyor 103 is restored to "up" position the limit switch 119 is operated and the motor 99 which drives conveyors 97 and 103 is stopped. In its uppermost position the ramp conveyor 103 is high enough to clear the pansets which can proceed beneath it without difficulty. Prior to raising ramp conveyor 103 the transport of pansets from the conveyors 16 and 20 is interrupted until all pansets clear the conveyors 97 and 103.

If the minimum proof time is desired the uppermost ramp conveyor 102 is lowered to the position shown in diagrammatic lines in FIGURE 16 in exactly the same manner and the operation is, of course, identical, with conveyor 20 this time being elevated sufficiently to deliver pansets to conveyor 21 and thence to conveyors 98 and 102.

Of course, any number of loops may be used in stacks L1 and L2 and additional ramp conveyors could be employed if desired. It is not even necessary that the stacks L1 and L2 have the same number of loops, however, in a proofer designed for maximum efficiency the pitch of the side run conveyors 28 and 32 will only be sufficient to connect to end run conveyors which are just high enough so that the pansets passing on the loop below clear them.

The walls of the proofer enclosure E are preferably insulated and, of course, the humidity and temperature inside the proofer are carefully regulated. Because each panset carrying bread or the like to fill a particular order travels exactly the same length of time in the proofer and proceeds through exactly the same path of travel, it is subjected to identical conditions and it will be apparent that the proof obtained is absolutely uniform. The fact that there may be some variance in conditions in various portions of the proofer itself, as usually is the case in a structure of this size, accordingly does not affect the uniformity of the proof. Because different proofing times of predetermined duration are available even though the feed of the proofer conveyor elements remains the same in accordance with the feed of the other machines and conveyors in the bread making production line, the baker can provide different fermentation times to suit a particular formula that he wishes to use. The system also is advantageous because the proofer can be built around support columns and the like in a room which can extend through the spaces between side run conveyors 26, 28, 30, and 32, and obviously, with these spaces and the provision of the doors D, the product is always accessible should accessibility to a particular panset be desired. While it is desirable to enter and leave the proofer from the ends thereof, it would, of course, be possible to enter and discharge from the sides near the ends of the proofer provided space is left inside the proofer to accommodate the turns which would be required to transfer the pansets in the same position in which they proceed to the proofer.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. In bread product handling apparatus and the like: a housing; sinuous first conveyor means within said housing comprising a stack of connected loops, each having longitudinally extending side runs joined by curvilinear end portions connecting different loops; the end portions of at least two non-adjacent loops intermediate the ends of the stack being inset with respect to the end portions of the other loops so as to overlie portons of the side runs of the subjacent loops; endless element second conveyor means extending into said housing at the level of said inset loops to points over the side runs of the said subjacent loops; and means for selectively feeding the product to one of said second conveyor means.

2. The combination defined in claim 1 in which said means for selectively feeding the product to one of said second conveyor means comprises a pivotally mounted conveyor section for communicating with a supplying conveyor at one end, swingable about said end to different positions to align selectively with said second conveyor means.

3. The combination defined in claim 1 in which said second conveyor means each comprises a pivotally mounted endless conveyor section having an inner end selectively swingable from a position spaced above the side run of the said subjacent loop down to said side run; and means for selectively holding said endless conveyor section in "up" position.

4. In bread product handling apparatus and the like: a housing; continuous conveyor means within said housing including a section leading upwardly in a stack of spiral loops from the lower portion of the housing to the top portion of the housing and a contiguous section connected therewith leading downwardly in a stack of spiral loops to the lower portion of the housing; said loops including longitudinally extending side runs joined by curvilinear end runs connecting different loops, with certain of said side runs being gradually pitched, said side runs and end runs comprising endless conveyors having spaced apart chains carrying longitudinally spaced, slat members, frame means for supporting said slat members intermediate the ends of said conveyors; at least one of said end runs in one of said stacks, between the lowermost and uppermost loop, being inset with respect to other of the end runs in the stack, and endless conveyor, product delivery means extending opposite the inset end run, the endless conveyor means including a portion swingable downwardly to the side run of the loop immediately under the inset run to deliver the product to the said side run, means feeding the product to said endless conveyor product conveyor means or to the bottom loop of the stack having the inset run and means discharging the product from the other stack.

5. In bread and bun product processing apparatus; a treating enclosure; first conveyor means within said enclosure providing a circuit of travel and including a sinuous stack of traveling runs connected one to another by traveling runs to provide a sinuous conveyor; and second conveyor means for delivering the product to and removing it from said circuit of travel; said second conveyor means including a delivery conveyor extending adjacent one of said runs, a discharging conveyor extending adjacent another run remote from said one of said runs, and at least one other product handling conveyor having a run traveling in substantially a plane extending adjacent a run between said one of said runs and said another run so that the length of travel of the product in said enclosure can be varied.

6. In bread product handling apparatus; a housing; a stack of vertically adjacent conveyor loops within said housing comprising vertically spaced, generally longitudinally extending side runs connected by end runs to form a sinuous conveyor; the end runs of at least two loops being longitudinally inset with respect to end runs of other loops; product delivery means within said housing adjacent to said inset runs; and means incorporated therewith including an element selectively movable toward and away from a loop situated between the endmost loops of said stack to transfer the product between the product delivery means and loop.

7. In bread product handling apparatus; a housing; a stack of vertically adjacent conveyor loops within said housing comprising vertically spaced, generally longitudinally extending side runs connected by end runs to form a sinuous conveyor; the end runs of at least two loops being longitudinally inset with respect to end runs of other loops; product transfer means within said housing adjacent to said inset end runs for moving the product to selected loops including product moving endless surface means movable toward a loop situated between the endmost loops of said stack; and means for driving said endless surface means.

8. In bread product making apparatus and the like; a treating housing; continuous first conveyor means within said housing including different elongated loops connected by moving end run portions and supported in vertically stacked relation, at least one of said loops between the lowermost and uppermost loops having a portion which is inset at one end with respect to the similar ends of its vertically adjacent loops; product delivering second conveyor means extending opposite the inset loop portion between the loops vertically adjacent to it; the second conveyor means including a portion swingable downwardly to the adjacent loop under the inset loop portion to deliver the product to the said adjacent loop; means for feeding the product to said second conveyor means; and means for discharging the product from said loops.

References Cited in the file of this patent

UNITED STATES PATENTS

| | | |
|---|---|---|
| 1,127,419 | Fairburn | Feb. 9, 1915 |
| 1,491,958 | Logan et al. | Apr. 29, 1924 |
| 1,614,056 | Ayars | Jan. 11, 1927 |
| 2,055,805 | Rapisarda | Sept. 29, 1936 |
| 2,389,759 | Blank et al. | Nov. 27, 1945 |
| 2,516,192 | Ensinger | July 25, 1950 |
| 2,591,971 | Skillman | Apr. 18, 1952 |
| 2,633,975 | Koerber | Apr. 7, 1953 |
| 2,664,188 | Rhodes | Dec. 29, 1953 |
| 2,747,725 | Hatch et al. | May 29, 1956 |
| 2,753,039 | Velten et al. | July 3, 1956 |
| 2,800,218 | Drouin | July 23, 1957 |
| 2,827,152 | Kampfer | Mar. 18, 1958 |
| 3,027,994 | Lanham | Apr. 3, 1962 |